(12) United States Patent
Hammack et al.

(10) Patent No.: US 8,793,039 B1
(45) Date of Patent: Jul. 29, 2014

(54) METHOD AND SYSTEM FOR PLAN MAP VERTICAL SITUATION DISPLAY

(75) Inventors: Jason L. Hammack, Seattle, WA (US); Peter D. Gunn, Redmond, WA (US); Michael J. Tucker, Lake Stevens, WA (US); Sherwin S. Chen, Bellevue, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 1009 days.

(21) Appl. No.: 12/491,194

(22) Filed: Jun. 24, 2009

(51) Int. Cl.
*G01C 21/00* (2006.01)

(52) U.S. Cl.
USPC ...... 701/14; 701/3; 701/4; 340/971; 340/977; 340/995.14; 340/995.27

(58) Field of Classification Search
USPC ............ 701/4, 10, 14, 18, 120, 122; 340/945, 340/970, 971, 973, 977, 995.14–995.17, 340/995.19, 995.24, 995.26, 995.27
See application file for complete search history.

(56) References Cited

U.S. PATENT DOCUMENTS

| 2005/0182528 | A1* | 8/2005 | Dwyer et al. | 701/3 |
| 2006/0004496 | A1* | 1/2006 | Tucker et al. | 701/4 |
| 2010/0070110 | A1* | 3/2010 | Badli et al. | 701/3 |

FOREIGN PATENT DOCUMENTS

JP 2005091248 A * 4/2005 ............. G01C 21/00

OTHER PUBLICATIONS

747 Flight Crew Operations Manual, Oct. 1, 2006, Chapter 11, Section 31, www.smartcockpit.com/site/pdf/download.php?file=plane/boeing/B747/systems/Flight_Management_and_Navigation_(B747-400).pdf.*

* cited by examiner

*Primary Examiner* — Khoi Tran
*Assistant Examiner* — Spencer Patton
(74) *Attorney, Agent, or Firm* — Klintworth & Rozenblat IP LLC (57) ABSTRACT

A flight information system may include a plan vertical situation display. The plan vertical situation display may display a vertical view of a flight path of an aircraft. The plan vertical situation display may display at least one path symbol showing at least one of a current path of the aircraft, a modified but not executed route of the aircraft, and an inactive route of the aircraft. The at least one path symbol may be adapted to display each of the current path of the aircraft, the modified but not executed route of the aircraft, and the inactive route of the aircraft. The plan vertical situation display may further display at least one terrain symbol showing a vertical terrain in the flight path along the at least one path symbol.

14 Claims, 12 Drawing Sheets

METHOD AND SYSTEM FOR PLAN MAP VERTICAL SITUATION DISPLAY

FIELD OF THE DISCLOSURE

The field of the disclosure relates to flight information systems and to computer-implemented methods of displaying flight information.

BACKGROUND OF THE DISCLOSURE

Aircraft often utilize flight information systems, such as displays, for navigation. One such display used today is a vertical situation display for showing a vertical view along a current flight path of the aircraft to gain understanding of the vertical terrain along the aircraft's current flight path. Although the vertical situation display may show a vertical view along the aircraft's current flight path, the vertical situation display may not show a vertical view of a modified but not executed route of the aircraft, and of an inactive route of the aircraft. As a result, it may be difficult to understand differences, such as in the vertical terrains, between an aircraft's current flight path, a modified but not executed route, and an inactive route.

Moreover, today's vertical situation displays may display information along the aircraft's current flight path, but the reference location of the vertical situation display may always be tied to the airplane position. The vertical situation display may not allow for the reference location of the vertical situation display to be changed. This may make flight planning in reference to down-path locations difficult.

Additionally, today's aircraft may not have vertical situation displays and lateral displays which show corresponding horizontal and vertical views along the aircraft's changing flight path, including along the aircraft's current flight path, along the aircraft's modified but not executed route, and along the aircraft's inactive route. This may further add to the difficulty of flight planning.

If there was a method for the vertical situation display to display not only a current path of the aircraft, but also to display a modified but not executed route of the aircraft, and of an inactive route of the aircraft, it would aid flight planning efforts. Moreover, if there was a method for the vertical situation display to change its reference location to various down-path reference locations, and to view it with high resolution information, it may help a user to understand the current or planned vertical path, may help the user understand the information, and may help the user make decisions about potentially modifying the flight path. Finally, flight planning would be less difficult if there was a method for providing vertical situation displays and lateral displays which show corresponding vertical and horizontal views along the aircraft's changing flight path, including along the aircraft's current flight path, along the aircraft's modified but not executed route, and along the aircraft's inactive route.

A flight information system and method of displaying flight information is needed which may solve one or more issues of one or more of the conventional flight information systems and methods.

SUMMARY OF THE DISCLOSURE

In one embodiment, a flight information system may include a plan vertical situation display. The plan vertical situation display may display a vertical view of a flight path of an aircraft. The plan vertical situation display may display at least one path symbol showing at least one of a current path of the aircraft, a modified but not executed route of the aircraft, and an inactive route of the aircraft. The at least one path symbol may be adapted to display each of the current path of the aircraft, the modified but not executed route of the aircraft, and the inactive route of the aircraft. The plan vertical situation display may further display at least one terrain symbol showing a vertical terrain in the flight path along the at least one path symbol.

In one embodiment, a flight information system may include a plan vertical situation display. The plan vertical situation display may display a vertical view of a flight path of an aircraft. The plan vertical situation display may display at least one position symbol comprising a reference position based on at least one of a position of the aircraft, a destination position, a waypoint position, a selected coordinate position, and a cursor selected position. The at least one position symbol may be user-selectable to allow a user to intermittently select whether the vertical view of the plan vertical situation display shows the reference position based on the position of the aircraft, the destination position, the waypoint position, the selected coordinate position, or the cursor-selected position. The plan vertical situation display may display at least one path symbol. The at least one path symbol may show at least one of a current path of an aircraft, a modified but not executed route of the aircraft, and an inactive route of the aircraft. The plan vertical situation display may display at least one terrain symbol. The at least one terrain symbol may show a vertical terrain in the flight path along the at least one path symbol.

In another embodiment, a computer-implemented method of displaying flight information regarding an aircraft may be provided. In one step, at least one position symbol may be selected comprising a reference position based on at least one of a position of an aircraft, a destination position, a waypoint position, a selected coordinate position, and a cursor selected position. In another step, a plan vertical situation may display a vertical view of a flight path of the aircraft referenced around the selected at least one position symbol, at least one path symbol, and at least one terrain symbol. The at least one path symbol may represent at least one of a current path of an aircraft, a modified but not executed route of the aircraft, and an inactive route of the aircraft. The at least one terrain symbol may represent a vertical terrain in the flight path along the at least one path symbol.

These and other features, aspects and advantages of the disclosure will become better understood with reference to the following drawings, description and claims.

DETAILED DESCRIPTION OF THE DISCLOSURE

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

One or more embodiments of the disclosure may allow a user (comprising a pilot, an aircraft crew member, or an air traffic controller) to view, in a plan vertical situation display, a vertical view of a flight path of an aircraft displaying a current path of the aircraft, a modified but not executed route of the aircraft, or an inactive route of the aircraft. The view shown by the plan vertical situation display may automatically toggle between the current path of the aircraft, the modified but not executed route of the aircraft, and the inactive route of the aircraft to allow the user to view and compare the respective vertical terrains. In such manner, the user may determine variances in the vertical terrain for each of the current path of the aircraft, the modified but not executed route of the aircraft, and the inactive route of the aircraft.

The user may also view a lateral display displaying a corresponding horizontal view of the flight path of the aircraft. The corresponding horizontal view of the lateral display may correspond to the vertical view shown by the plan vertical situation display. The lateral display may similarly automatically toggle between the current path of the aircraft, the modified but not executed route of the aircraft, and the inactive route of the aircraft in order to show their respective corresponding horizontal views. By viewing the plan vertical situation display and the corresponding lateral display, the user may determine additional information, in both vertical and horizontal views, regarding the aircraft's flight path, such as waypoint information, destination information, aircraft position information, terrain information, direction information, altitude information, distance information, or other types of flight path information.

One or more embodiments of the disclosure may allow the user to control what reference position the vertical view shown by the plan vertical situation display is referenced around. The user may intermittently select varying reference positions, comprising a position of the aircraft, a destination position, a waypoint position, a coordinate position, a cursor position, or another type of position, for the plan vertical situation display to be referenced around. The user may center the plan vertical situation display around the selected reference position.

The corresponding horizontal view of the lateral display may similarly be referenced around the reference position selected by the user in order to display the corresponding horizontal view of the area shown by the plan vertical situation display. The lateral display may be centered around the selected reference position. By selecting varying reference positions, the user may view varying areas on or off the aircraft's flight path with high resolution allowing the user to obtain additional information regarding the areas around the selected reference positions. This may help the user gather further information regarding areas along the current path of the aircraft, along the modified but not executed route of the aircraft, and along the inactive route of the aircraft. This may help the user understand the current or planned flight path, may help the user understand additional information, or may help the user make decisions about potentially modifying the aircraft's flight path.

Figure 1:
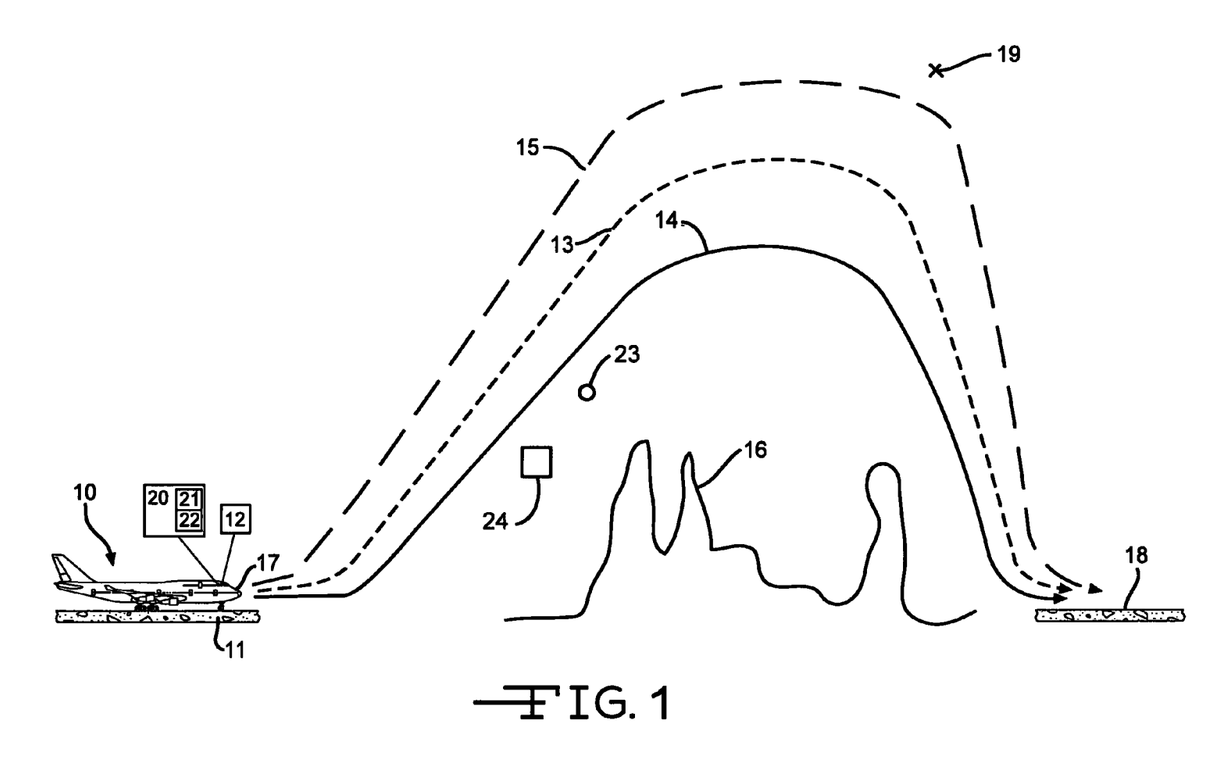
FIG. 1 is an illustration of a side view of one embodiment of an aircraft stopped on a runway about to take-off.

FIG. 1 is an illustration of a side view of one embodiment of an aircraft 10 stopped on a runway 11 about to take-off. The aircraft 10 may have stored in a flight management system 12 an inactive route 13 which has not been selected, a selected current path 14, and a modified but not executed route 15. The illustration shows the terrain 16 the aircraft 10 will be flying over from its current position 17 to its destination 18 which may comprise a runway. During flight, the aircraft 10 may fly near or through at least one waypoint 19. Installed on the aircraft 10 may be a flight information system 20. The flight information system 20 may comprise a plan vertical situation display 21 displaying a vertical view of a flight path of the aircraft 10, with the flight path comprising one of the current path 14, the modified but not execute route 15, or the inactive route 13. The flight information system 20 may further comprise a lateral display 22 displaying a corresponding horizontal view of a flight path shown by the plan vertical situation display 21. The views of the plan vertical situation display 21 and the corresponding lateral display 22 may be referenced around, at the user's discretion, a reference position comprising the aircraft's position 10, the destination position 18, the waypoint position 19, a selected coordinate position 23, or a cursor selected position 24. The user may center the views of the plan vertical situation display 21 and the corresponding lateral display 22 around the reference position.

Figure 2:
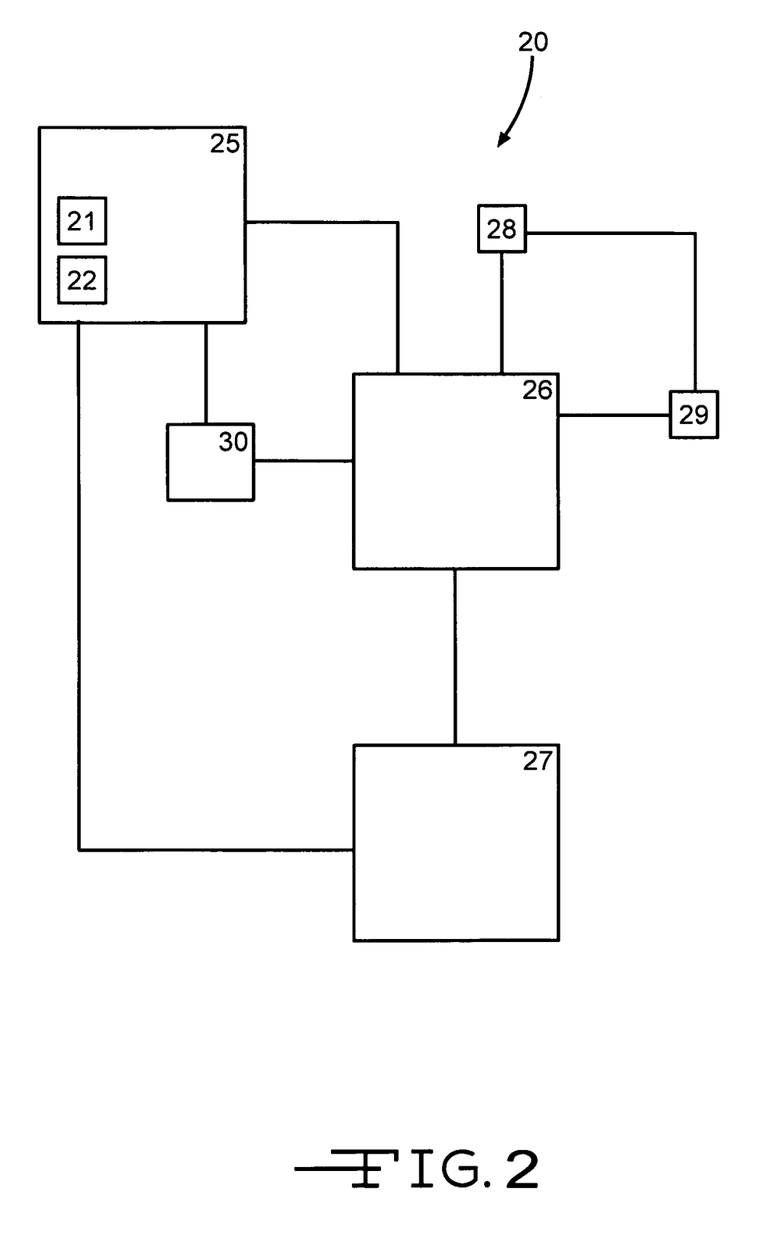
FIG. 2 is an illustration of a box diagram showing one embodiment of a flight information system.

FIG. 2 is an illustration of a schematic diagram showing one embodiment of the flight information system 20. The flight information system 20 may comprise at least one electronic display device 25, at least one computer 26, at least one electronic input device 27, at least one memory 28, and at least one database 29. The at least one electronic display device 25 may comprise the plan vertical situation display 21 and the lateral display 22, either of which may reference to or center on, at the user's discretion, the reference position comprising the position 17 (see FIG. 1) of the aircraft 10 (see FIG. 1) at one selected point in time, the selected waypoint 19 (see FIG. 1), the destination 18 (see FIG. 1), the selected coordinate position 23 (see FIG. 1), or the cursor selected position 24 (see FIG. 1). The at least one electronic display device 25 may be operatively connected to the at least one computer 26.

The at least one computer 26 may be in communication directly and indirectly with said at least one memory 28 which may store said at least one database 29. The at least one computer 26 may calculate the path of the airplane, and may determine other airplane information. The at least one computer 26 and the at least one electronic display device 25 may be in communication with one or more information providing devices 30. The one or more information providing devices 30 may comprise a flight management computer system, an inertial reference system, airplane sensors, display systems, and other information providing devices. The one or more information providing devices 30 may contain information, to be displayed by the plan vertical situation display 21 and the lateral display 22, regarding the aircraft's position 17 (see FIG. 1), the terrain 16 (see FIG. 1), the selected coordinate position 23 (see FIG. 1), the cursor selected position 24 (see FIG. 1), the selected waypoint 19 (see FIG. 1), the inactive route 13 (see FIG. 1), the selected current path 14 (see FIG. 1), the modified but not executed route 15 (see FIG. 1), and other pertinent flight information. The at least one electronic input device 27 may be operatively connected to the at least one computer 26 to allow information to be entered by the user into the at least one computer 26. The at least one computer 26 may be programmed to use the information from the at least one database 29 to generate the vertical view and the corresponding horizontal view displayed by the plan vertical situation display 21 and the lateral display 22.

Figure 3:
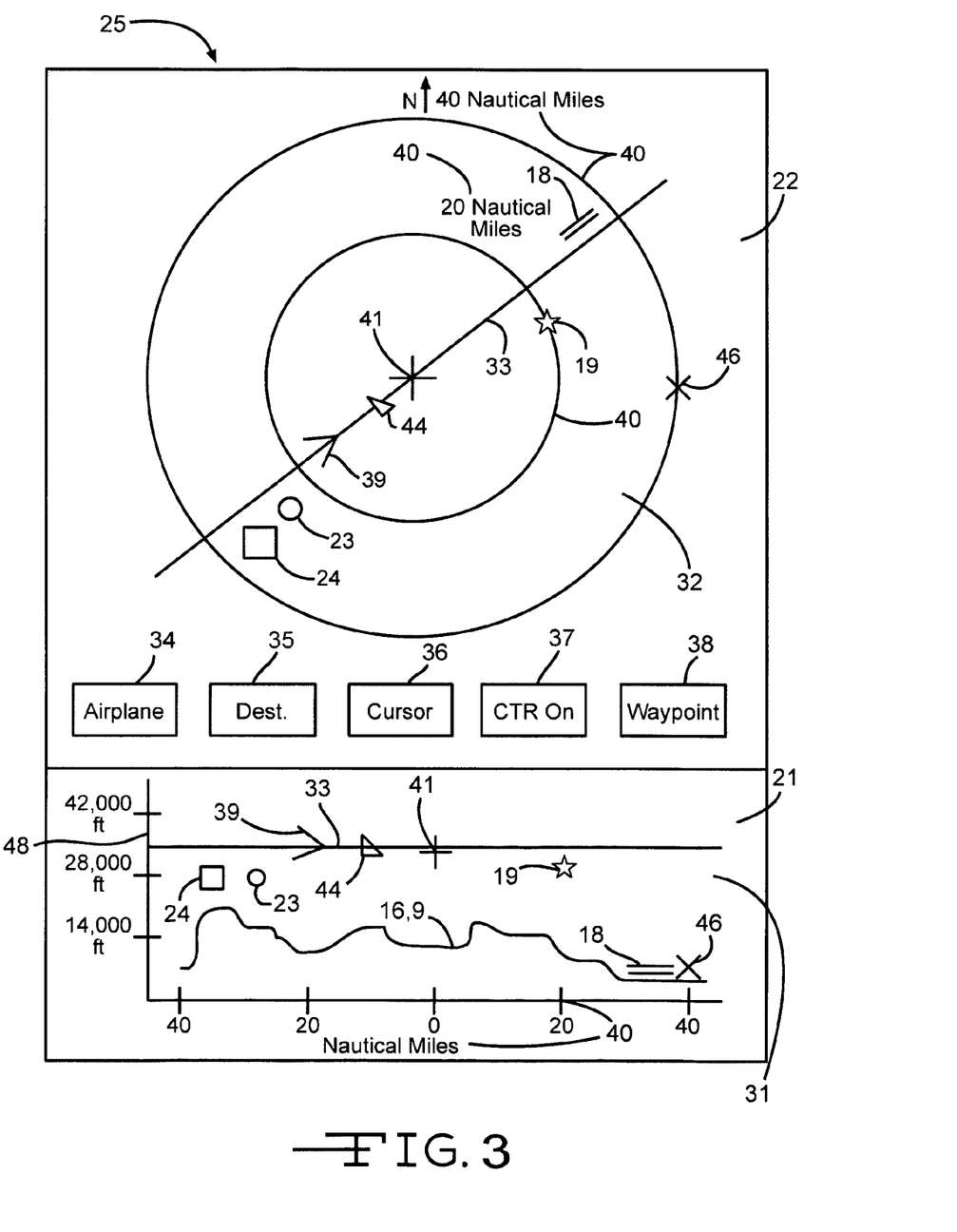
FIG. 3 is an illustration of one embodiment of an electronic display device, comprising a plan vertical situation display and a lateral display, centered around a first symbol.

FIG. 3 is an illustration of one embodiment of the at least one electronic display device 25 showing the plan vertical situation display 21 and the lateral display 22. The plan vertical situation display 21 and the lateral display 22 may respectively display vertical 31 and corresponding horizontal views 32 of a flight path of the aircraft 10 (see FIG. 1). The flight path of the aircraft 10 may be displayed by at least one path symbol 33 showing one of the aircraft's current path 14 (see FIG. 1), the modified but not executed route 15 (see FIG. 1), or the inactive route 13 (see FIG. 1). The vertical view 31 of the plan vertical situation display 21 and the corresponding horizontal view 32 of the lateral display may automatically toggle between displaying a path symbol 33 comprising the current path 14 (see FIG. 1), the modified but not executed route 15 (see FIG. 1), or the inactive route 13 (see FIG. 1) depending on which flight path is applicable at that moment. By viewing the plan vertical situation display 21, the user may view differences in these varying flight paths, such as by viewing differences in their respective vertical terrain symbols 9 depicting the respective vertical terrains 16 over each of these varied flight paths.

Figure 4:
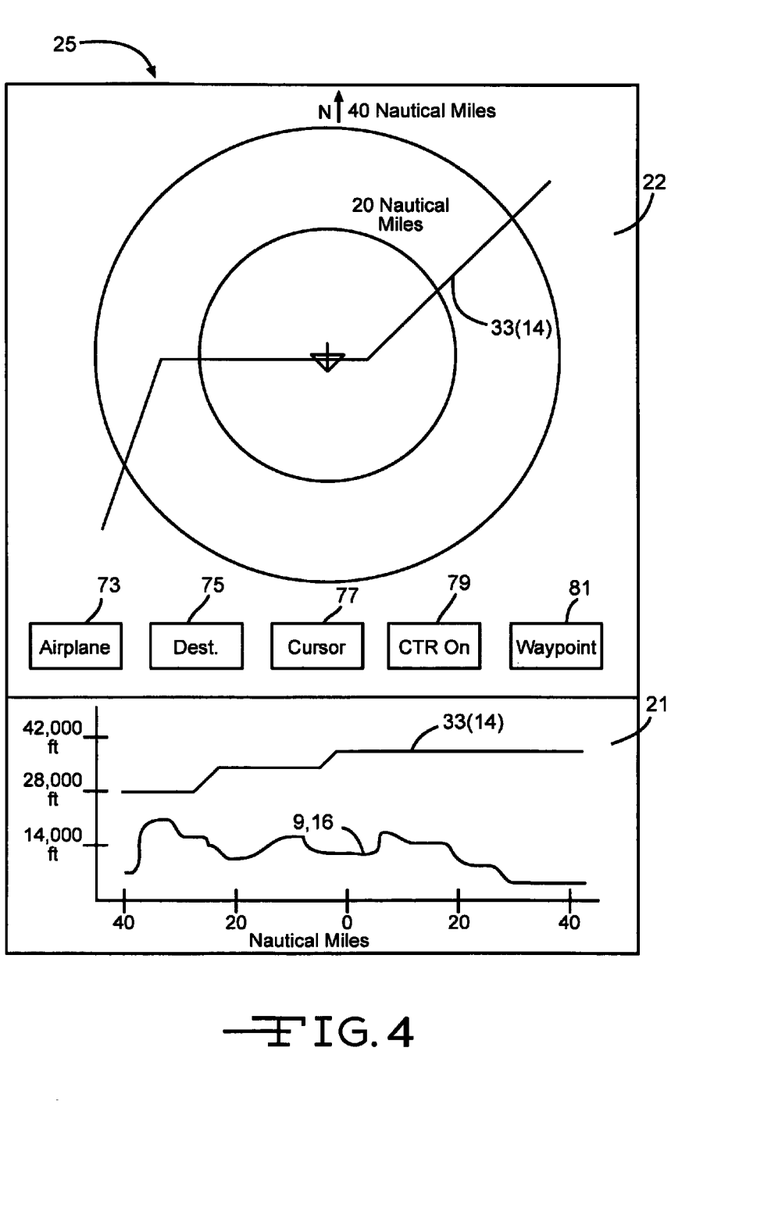
FIG. 4 is an illustration of one embodiment of an electronic display device, comprising a plan vertical situation display and a lateral display, displaying a current flight path of an aircraft.

FIG. 4 is an illustration of one embodiment of an electronic display device 25 with the plan vertical situation display 21 and the lateral display 22 displaying a flight path of the aircraft 10 (see FIG. 1) with a path symbol 33 comprising the aircraft's current path 14. As shown in the plan vertical situation display 21, a user may view the vertical terrain 16, shown by the terrain symbol 9, over the aircraft's current path 14.

Figure 5:
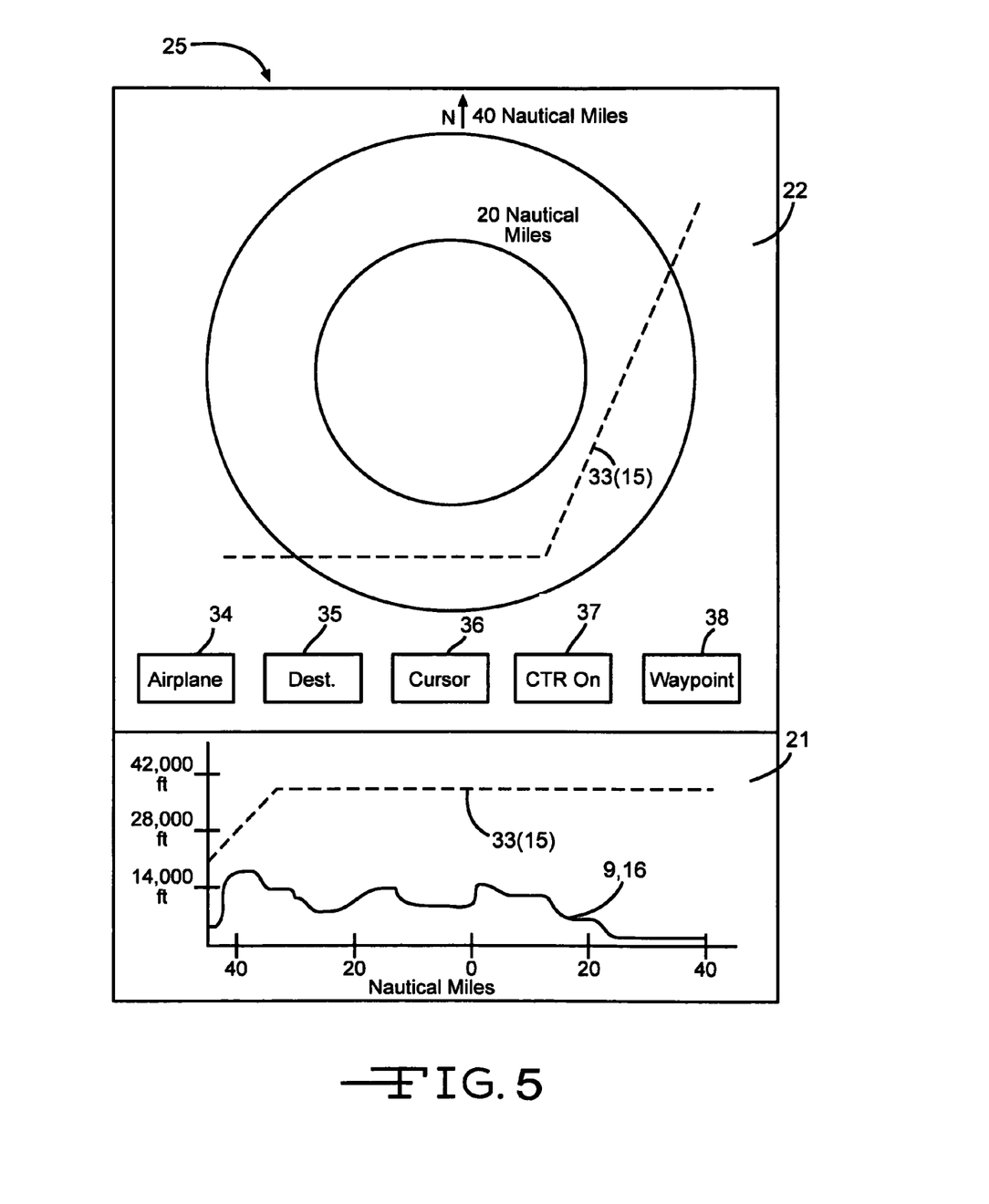
FIG. 5 is an illustration of one embodiment of an electronic display device, comprising a plan vertical situation display and a lateral display, displaying a modified but not executed route of an aircraft.

FIG. 5 is an illustration of one embodiment of an electronic display device 25 with the plan vertical situation display 21 and the lateral display 22 displaying a flight path of the aircraft 10 (see FIG. 1) with a path symbol 33 comprising the aircraft's modified but not executed route 15. As shown in the plan vertical situation display 21, a user may view the vertical terrain 16, shown by the terrain symbol 9, over the aircraft's modified but not executed route 15.

Figure 6:
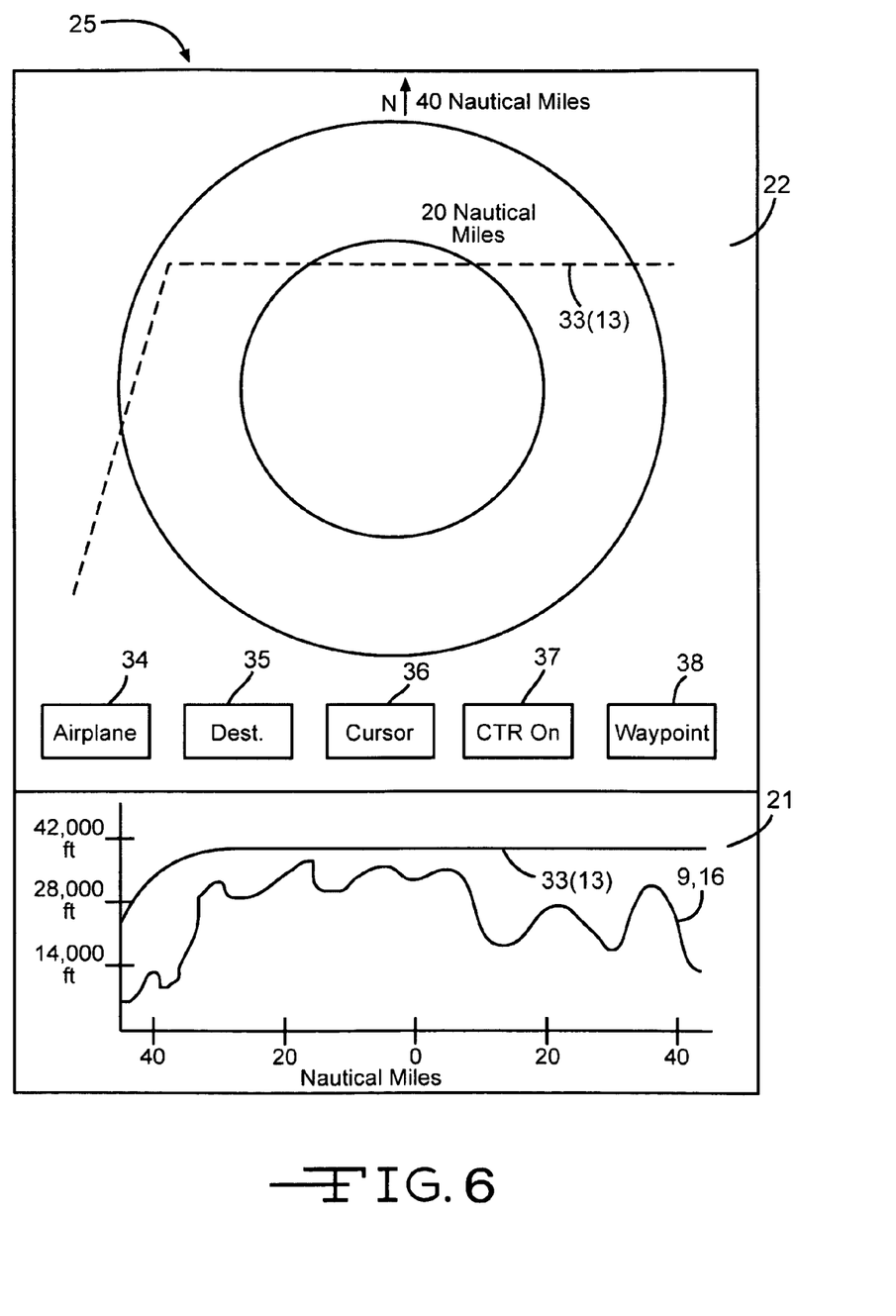
FIG. 6 is an illustration of one embodiment of an electronic display device, comprising a plan vertical situation display and a lateral display, displaying an inactive route of the aircraft.

FIG. 6 is an illustration of one embodiment of an electronic display device 25 with the plan vertical situation display 21 and the lateral display 22 displaying a flight path of the aircraft 10 (see FIG. 1) with a path symbol 33 comprising the aircraft's inactive route 13. As shown in the plan vertical situation display 21, a user may view the vertical terrain 16, shown by the terrain symbol 9, over the aircraft's inactive route 13. By observing differences in the views of FIGS. 4-6, a user may determine additional information (i.e. terrain 16, differences in the paths themselves, etc.) regarding these varying flight paths of the aircraft 10 (see FIG. 1).

As shown in FIG. 3, the vertical view 31 of the plan vertical situation display 21 and the corresponding horizontal view 32 of the lateral display 22 may be referenced around at least one position symbol 41. The at least one position symbol 41 may comprise a reference position based on, at the user's selection, at least one of the position 17 (see FIG. 1) of the aircraft 10 (see FIG. 1) at one selected point in time, the selected waypoint 19 (see FIG. 1), the destination 18 (see FIG. 1), the selected coordinate position 23 (see FIG. 1), and the cursor selected position 24 (see FIG. 1). The vertical and horizontal views 31 and 32 of the plan vertical situation display and lateral display 21 and 22 may be centered around the position symbol 41. By changing the position symbol 41 to varying reference positions, the user may view varying areas on and off the aircraft's flight path with high resolution allowing the user to obtain additional information regarding the areas around the selected reference positions. This may help the user gather further information regarding areas along the current path 14 of the aircraft 10, along the modified but not executed route 15 of the aircraft 10, or along the inactive route 13 of the aircraft 10. This may help the user understand the current or planned flight path, may help the user understand additional information, or may help the user make decisions about potentially modifying the aircraft's flight path.

A user may selectively and intermittently control what the at least one position symbol represents 33, and thereby what the vertical view 31 of the plan vertical situation display 21 and the corresponding horizontal view 32 of the lateral display 22 are referenced around, by using one of an airplane controller 34, a destination controller 35, a cursor controller 36, a coordinate controller 37, or a waypoint controller 38. If a user uses the airplane controller 34, the vertical and corresponding horizontal views 31 and 32 of the plan vertical situation display and the lateral display 21 and 22 may be referenced around the at least one position symbol 41 comprising the position 17 (see FIG. 1) of the aircraft 10 (see FIG. 1) at one selected point in time. If a user uses the destination controller 35, the vertical and corresponding horizontal views 31 and 32 of the plan vertical situation display and the lateral display 21 and 22 may be referenced around the at least one position symbol 41 comprising the destination position 18 (see FIG. 1). If a user uses the cursor controller 36, the vertical and corresponding horizontal views 31 and 32 of the plan vertical situation display and the lateral display 21 and 22 may be referenced around the at least one position symbol 41 comprising the cursor selected position 24 (see FIG. 1). If a user uses the coordinate controller 37, the vertical and corresponding horizontal views 31 and 32 of the plan vertical situation display and the lateral display 21 and 22 may be referenced around the at least one position symbol 41 comprising the selected coordinate position 37 (see FIG. 1). If a user uses the waypoint controller 38, the vertical and corresponding horizontal views 31 and 32 of the plan vertical situation display and the lateral display 21 and 22 may be referenced around the at least one position symbol 41 comprising the selected waypoint position 19 (see FIG. 1).

The vertical view 31 of the plan vertical situation display 21 and the corresponding horizontal view 32 of the lateral display 22 may further display at least one direction symbol 39 showing the direction of the aircraft 10 (see FIG. 1) on the at least one path symbol 33 comprising one of the aircraft's current path 14 (see FIG. 1), the modified but not executed route 15 (see FIG. 1), and the inactive route 13 (see FIG. 1).

The vertical view 31 of the plan vertical situation display 21 and the corresponding horizontal view 32 of the lateral display 22 may further display at least one distance symbol 40 displaying a distance away, relative to the at least one position symbol 41, of at least one of (see FIG. 1) the aircraft 10 (when the at least one position symbol 41 does not comprise the aircraft 10), the destination position 18 (when the at least one position symbol 41 does not comprise the destination position 18), and the selected waypoint position 19 (when the at least one position symbol 41 does not comprise the waypoint position 19). The vertical view 31 of the plan vertical situation display 21 may further display at least one altitude symbol 48 displaying at least one altitude of the at least one position symbol 41 and the aircraft 10 (see FIG. 1).

When the at least one position symbol 41 represents one of the destination position 18 (see FIG. 1), the selected waypoint position 19 (see FIG. 1), the selected coordinate position 23 (see FIG. 1), and the cursor selected position 24 (see FIG. 1), the plan vertical situation display 21 and the lateral display 22 may further display an aircraft symbol 44 representing the position 17 (see FIG. 1) of the aircraft 10 (see FIG. 1). When the at least one position symbol 41 represents the position 17 (see FIG. 1) of the aircraft 10 (see FIG. 1), the plan vertical situation display 21 and the lateral display 22 may further display at least one non-aircraft symbol 46 representing at least one of the destination position 18 (see FIG. 1) and the selected waypoint position 19 (see FIG. 1).

The plan vertical situation display and the lateral display 21 and 22 may display movement of the aircraft 10 (see FIG. 1), represented by position symbol 41 (when the position symbol represents the position of the aircraft) or by aircraft symbol 44 (when the position symbol does not represent the position of the aircraft), relative to at least one of the position symbol 41, the destination position 18, the selected waypoint position 19, the selected coordinate position 23, and the cursor selected position 24. As the aircraft 10 (see FIG. 1) moves, the vertical and horizontal views 31 and 32 of the plan vertical situation display and the lateral display 21 and 22 may remain referenced to the initial position of the position symbol 41.

Figure 7:
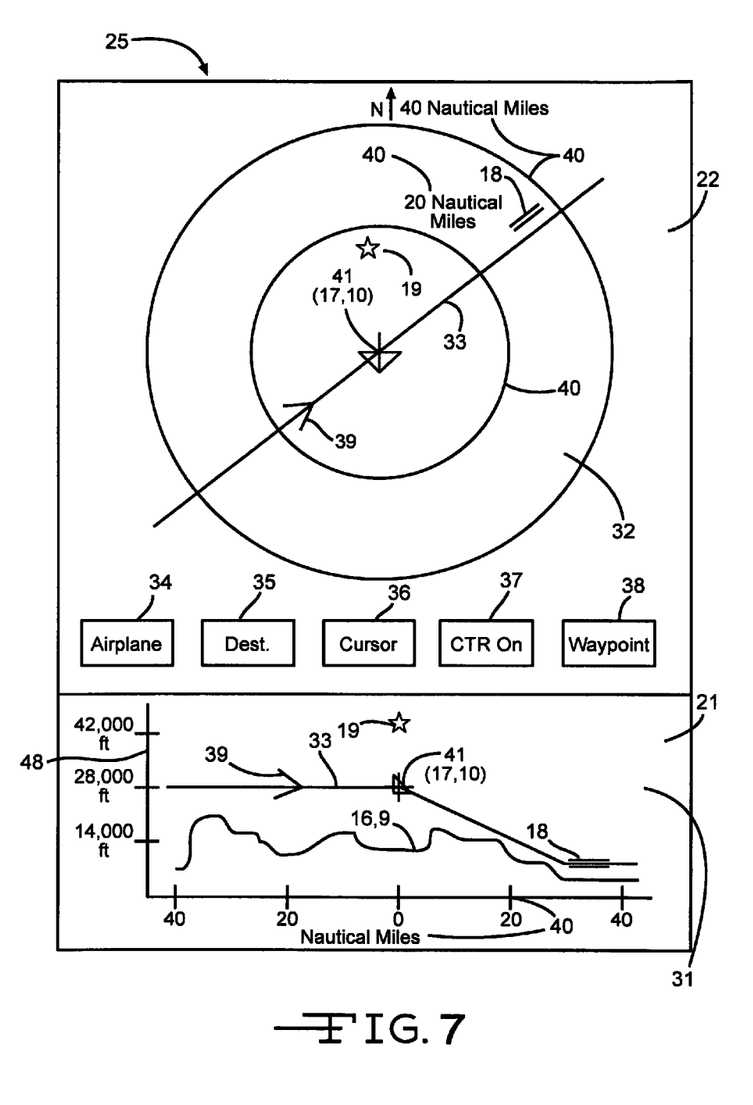
FIG. 7 is an illustration of one embodiment of an electronic display device, comprising a plan vertical situation display and a lateral display, centered around a position of an aircraft at one point in time.

FIG. 7 is an illustration of one embodiment of the at least one electronic display device 25 showing the plan vertical situation display 21 and the corresponding lateral display 22 when a user users the airplane controller 34 to reference the vertical view 31 of the plan vertical situation display 21 and the corresponding horizontal view 32 of the lateral display 22 around a position symbol 41 comprising the position 17 of the aircraft 10. As shown, the lateral display 21 and the plan vertical situation display 22 may be centered around the position symbol 41 comprising the position 17 of the aircraft 10 at one selected point in time. This view may allow a user to focus the view around the aircraft 10.

Figure 8:
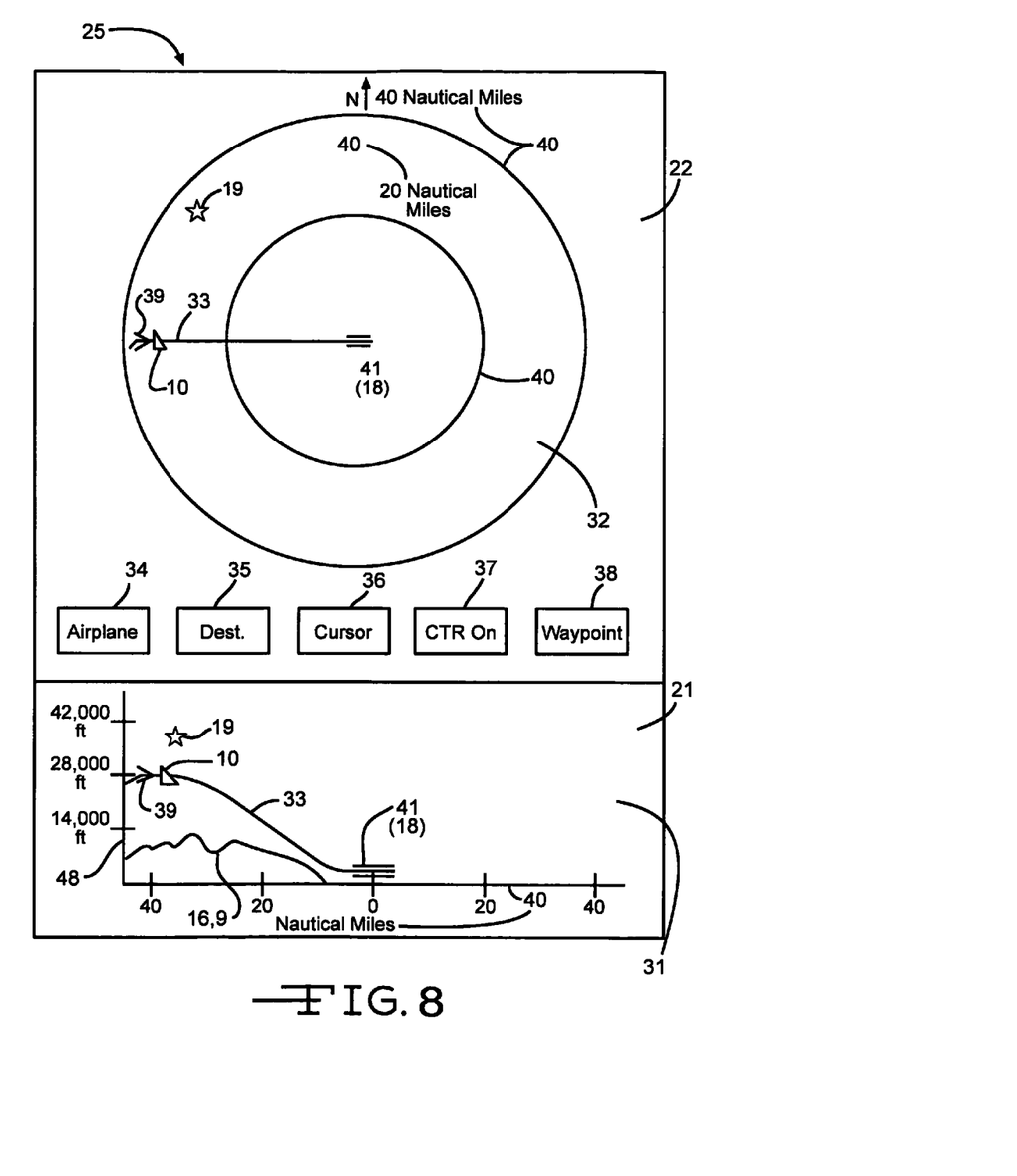
FIG. 8 is an illustration of one embodiment of an electronic display device, comprising a plan vertical situation display and a lateral display, centered around a destination position.

FIG. 8 is an illustration of one embodiment of the at least one electronic display device 25 showing the plan vertical situation display 21 and the corresponding lateral display 22 when a user users the destination controller 35 to reference the vertical view 31 of the plan vertical situation display 21 and the corresponding horizontal view 32 of the lateral display 22 around a position symbol 41 comprising the destination position 18. As shown, the lateral display 21 and the plan vertical situation display 22 may be centered around the position symbol 41 comprising the destination position 18. This view may allow a user to focus the view around the destination position 18.

Figure 9:
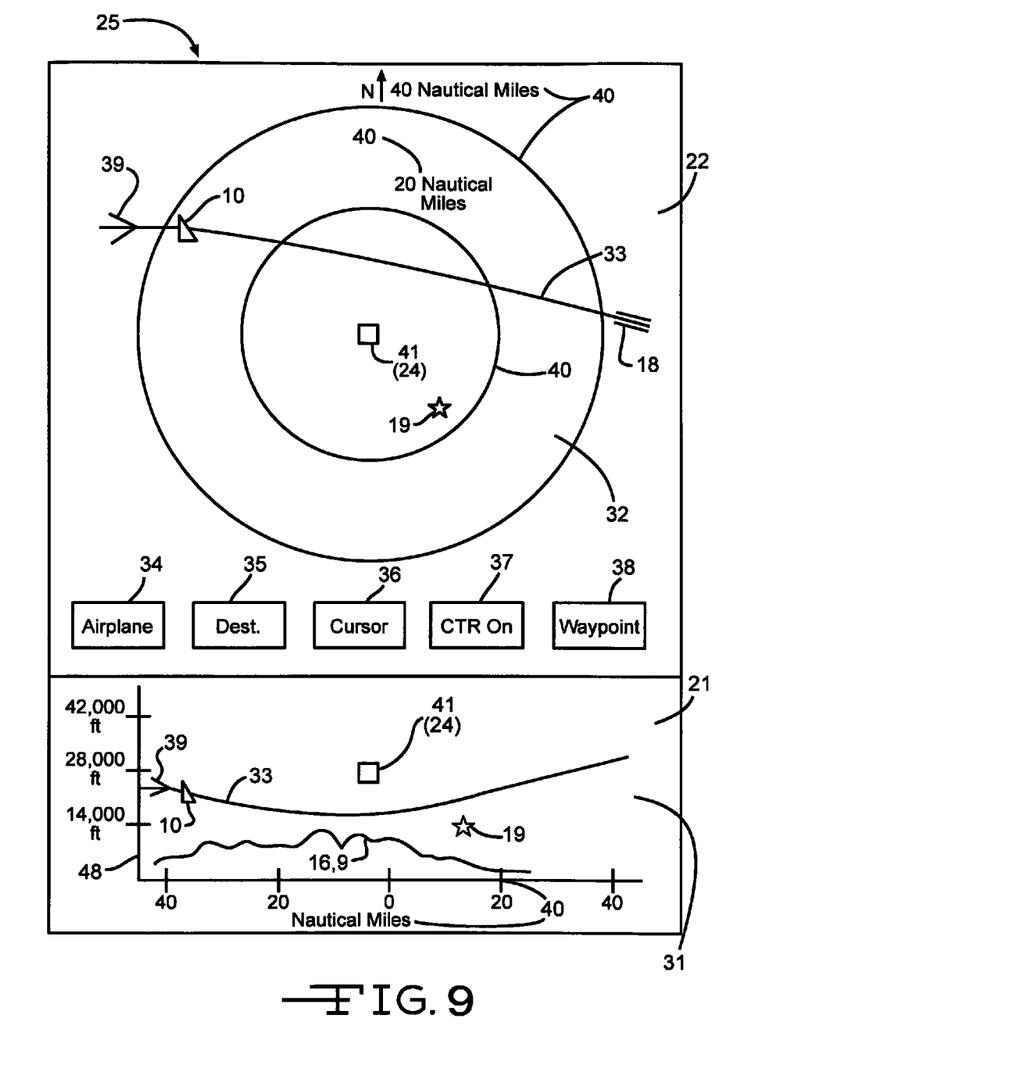
FIG. 9 is an illustration of one embodiment of an electronic display device, comprising a plan vertical situation display and a lateral display, centered around a cursor selected position.

FIG. 9 is an illustration of one embodiment of the at least one electronic display device 25 showing the plan vertical situation display 21 and the corresponding lateral display 22 when a user users the cursor controller 36 to reference the vertical view 31 of the plan vertical situation display 21 and the corresponding horizontal view 32 of the lateral display 22 around a position symbol 41 comprising the cursor selected position 24. As shown, the lateral display 21 and the plan vertical situation display 22 may be centered around the position symbol 41 comprising the cursor selected position 24. This view may allow a user to focus the view around the cursor selected position 24, which may comprise any cursor selected position.

Figure 10:
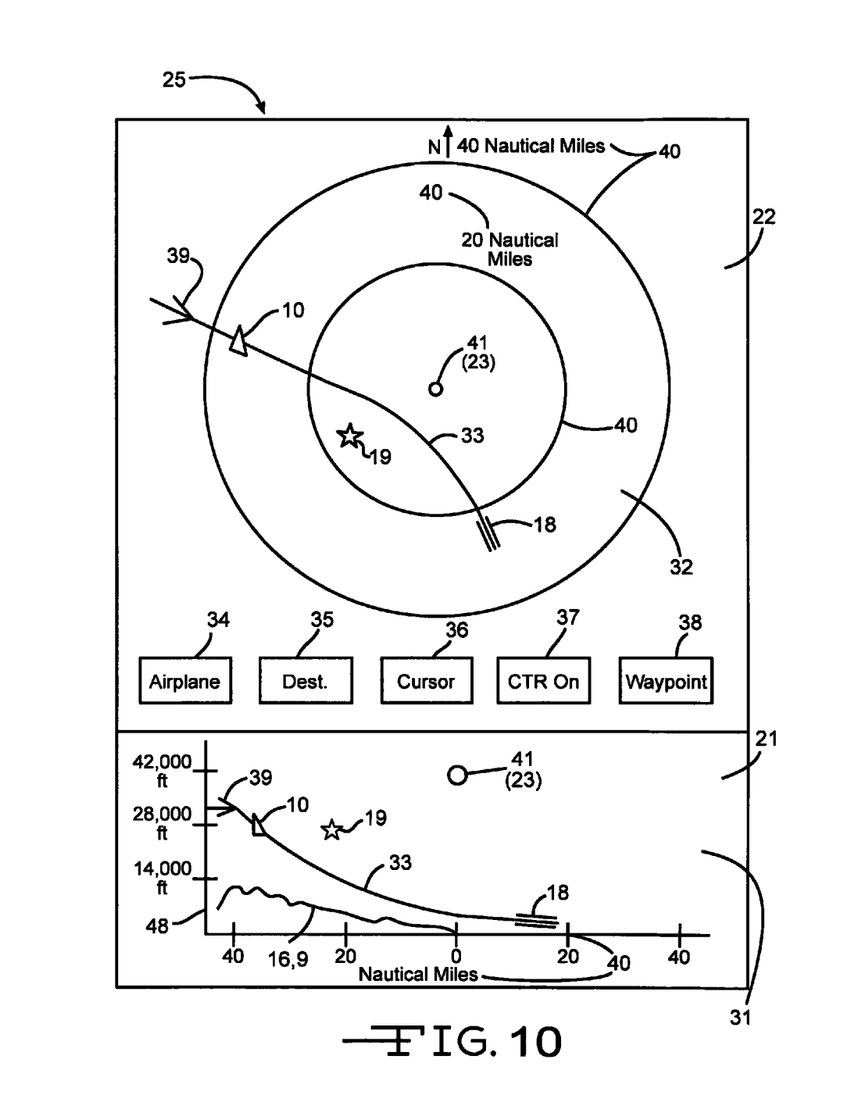
FIG. 10 is an illustration of one embodiment of an electronic display device, comprising a plan vertical situation display and a lateral display, centered around a selected coordinate position.

FIG. 10 is an illustration of one embodiment of the at least one electronic display device 25 showing the plan vertical situation display 21 and the corresponding lateral display 22 when a user users the coordinate controller 37 to reference the vertical view 31 of the plan vertical situation display 21 and the corresponding horizontal view 32 of the lateral display 22 around a position symbol 41 comprising the selected coordinate position 23. As shown, the lateral display 21 and the plan vertical situation display 22 may be centered around the position symbol 41 comprising the selected coordinate position 23. This view may allow a user to focus the view around the selected coordinate position 23, which may comprise any selected coordinate position.

Figure 11:
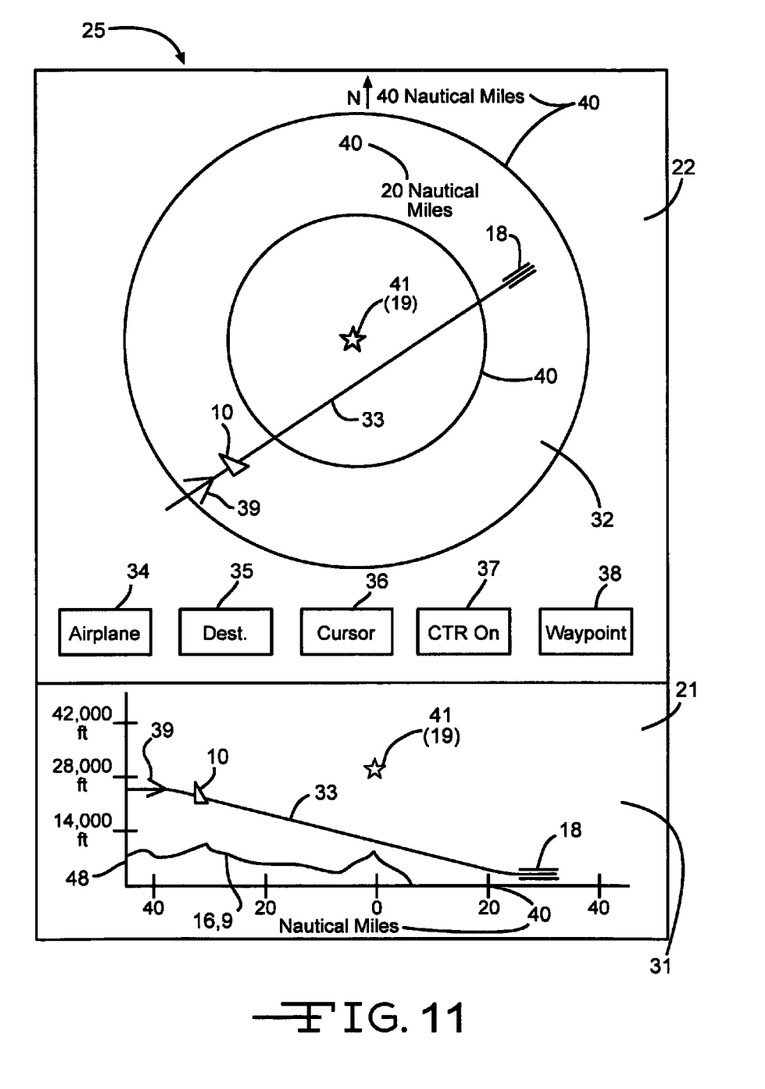
FIG. 11 is an illustration of one embodiment of an electronic display device, comprising a plan vertical situation display and a lateral display, centered around a selected waypoint position.

FIG. 11 is an illustration of one embodiment of the at least one electronic display device 25 showing the plan vertical situation display 21 and the corresponding lateral display 22 when a user users the waypoint controller 38 to reference the vertical view 31 of the plan vertical situation display 21 and the corresponding horizontal view 32 of the lateral display 22 around a position symbol 41 comprising the selected waypoint position 19. As shown, the lateral display 21 and the plan vertical situation display 22 may be centered around the position symbol 41 comprising the selected waypoint position 19. This view may allow a user to focus the view around the selected waypoint position 19, which may comprise any selected waypoint position. It should be noted that FIGS. 3-11 show varying embodiments and varying flight paths of the aircraft 10 (see FIG. 1).

Figure 12:
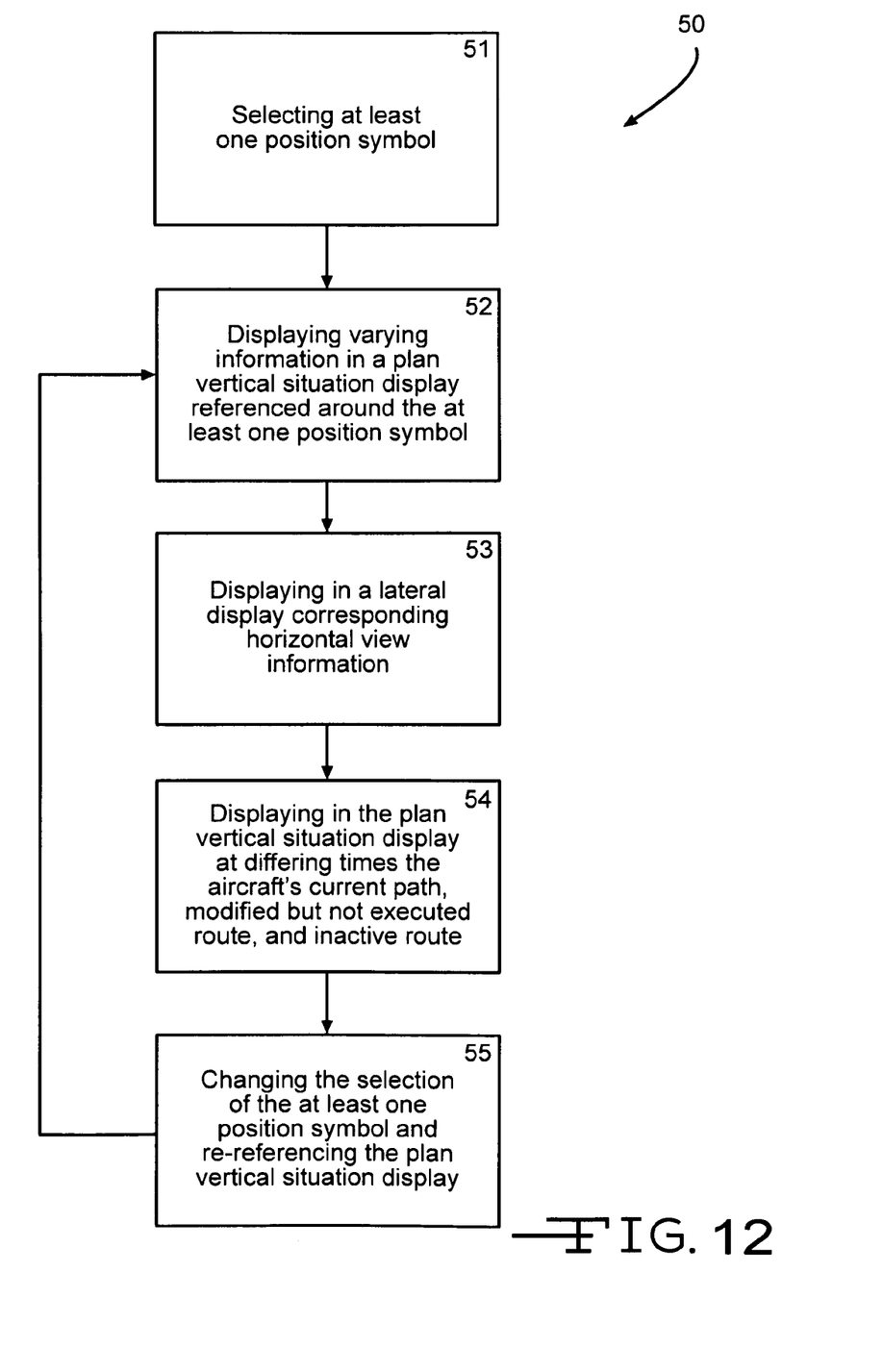
FIG. 12 is an illustration of a flowchart showing one embodiment of a computer-implemented method of displaying flight information regarding an aircraft.

FIG. 12 is an illustration of a flowchart showing one embodiment of a computer-implemented method 50 of displaying flight information regarding an aircraft 10. FIG. 12 illustrates particular steps for one embodiment of an exemplary method. In other embodiments, the order of the steps of the method may vary. In step 51, at least one position symbol 41 may be selected. The at least one position symbol may comprise a reference position based on at least one of a position 17 of an aircraft 10, a destination position 18, a waypoint position 19, a selected coordinate position 23, and a cursor selected position 24.

In step 52, a plan vertical situation display 21 may display the following: a vertical view 31 of a flight path of the aircraft 10 referenced around the selected at least one position symbol 41; at least one path symbol 33 representing at least one of a current path 14 of an aircraft 10, a modified but not executed route 15 of the aircraft 10, and an inactive route 13 of the aircraft 10; and at least one terrain symbol 9 representing a vertical terrain 16 in the flight path along the at least one path symbol 33. In one embodiment, step 52 may comprise centering the vertical view 31 of the flight path displayed in the plan vertical situation display 21 around the selected at least one position symbol 41.

Optional step 53 may comprise displaying in a lateral display 22 a corresponding horizontal view 32 of the flight path shown by the plan vertical situation display 21. In one embodiment, optional step 53 may comprise displaying in the lateral display 22 at least one of the following: the at least one position symbol 41 comprising the reference position based on at least one of the position 17 of the aircraft 10, the destination position 18, the waypoint position 19, the selected coordinate position 23, and the cursor selected position 24;

the at least one path symbol 33 representing at least one of the current path 14 of the aircraft 10, the modified but not executed route 15 of the aircraft 10, and the inactive route 13 of the aircraft 10; and at least one direction symbol 39 representing a direction of the aircraft 10 on at least one of the current path 14 of the aircraft 10, the modified but not executed route 15 of the aircraft 10, and the inactive route 13 of the aircraft 10.

Optional step 54 may comprise displaying in the plan vertical situation 21 display at different times the current path 14 of the aircraft 10, the modified but not executed route 15 of the aircraft 10, and the inactive route 13 of the aircraft 10. Optional step 55 may comprise changing the selection of the at least one position symbol 41, and at least one of referencing around and centering the vertical view 31 of the flight path displayed in the plan vertical situation display 21 around the changed at least one position symbol 41.

One or more embodiments of the disclosure may allow a user to view, in a plan vertical situation display and in a lateral display, respective vertical and horizontal views of a flight path of an aircraft comprising a current path of the aircraft, a modified but not executed route of the aircraft, and an inactive route of the aircraft. The views may automatically toggle between the current path of the aircraft, the modified but not executed route of the aircraft, and the inactive route of the aircraft to allow the user to view and compare the respective vertical terrains. This may allow the user to determine variances in the vertical terrain for each of the current path of the aircraft, the modified but not executed route of the aircraft, and the inactive route of the aircraft.

One or more embodiments of the disclosure may allow the user to control what reference position the vertical and horizontal views of the respective plan vertical situation display and lateral display are referenced around. The user may intermittently select varying reference positions, comprising a position of the aircraft, a destination position, a waypoint position, a coordinate position, a cursor position, or another type of position, for the plan vertical situation display and lateral display to be referenced around. The user may center the plan vertical situation display and lateral display around the selected reference position. By selecting varying reference positions, the user may view varying areas on or off the aircraft's flight path with high resolution allowing the user to obtain additional information regarding the areas around the selected reference positions. This may help the user gather further information regarding areas along the current path of the aircraft, along the modified but not executed route of the aircraft, and along the inactive route of the aircraft. This may help the user understand the current or planned flight path, may help the user understand additional information, or may help the user make decisions about potentially modifying the aircraft's flight path.

It should be understood, of course, that the foregoing relates to exemplary embodiments of the disclosure and that modifications may be made without departing from the spirit and scope of the disclosure as set forth in the following claims.

We claim:

1. A flight information system comprising:
    a plan vertical situation display displaying a vertical view of a flight path of an aircraft, the plan vertical situation display displaying:
        a position symbol comprising a reference position, that the plan vertical situation display displays and is positioned around, based on a position of the aircraft, a destination position, a waypoint position, a selected coordinate position, or a cursor selected position, wherein the position symbol is user-selectable to allow a user to intermittently select and toggle between, each of one at a time, whether the vertical view of the plan vertical situation display displays and is positioned around the reference position based on the position of the aircraft, the destination position, the waypoint position, the selected coordinate position, or the cursor-selected position;
        a path symbol displaying a current path of the aircraft, a modified but not executed route of the aircraft, or an inactive route of the aircraft; and
        a terrain symbol displaying a vertical terrain in the flight path along the path symbol;
    and a plurality of separate controllers comprising an airplane position controller, a destination position controller, a waypoint position controller, a selected coordinate position controller, and a cursor selected position controller for controlling which reference position the plan vertical display displays and is positioned around.

2. The flight information system of claim 1 wherein the vertical view of the plan vertical situation display is centered around the user-selectable position symbol.

3. The flight information system of claim 1 wherein the path symbol is adapted to intermittently toggle between and display, each of one at a time, the current path of the aircraft, the modified but not executed route of the aircraft, or the inactive route of the aircraft.

4. The flight information system of claim 1 wherein the plan vertical situation display further displays a direction symbol representing a direction of the aircraft on the current path of the aircraft, the modified but not executed route of the aircraft, or the inactive route of the aircraft.

5. The flight information system of claim 1 wherein the plan vertical situation display further displays a distance symbol displaying a distance away, relative to the position symbol, of the aircraft, the destination position, or the waypoint position.

6. The flight information system of claim 1 wherein the plan vertical situation display further displays an altitude symbol displaying an altitude of the aircraft.

7. The flight information system of claim 1 further comprising:
    a lateral display displaying a corresponding horizontal view of the flight path shown by the plan vertical situation display.

8. The flight information system of claim 7 wherein the lateral display further displays:
    the position symbol comprising the reference position based on the position of the aircraft, the destination position, the waypoint position, the selected coordinate position, or the cursor selected position;
    the path symbol displaying the current path of the aircraft, the modified but not executed route of the aircraft, or the inactive route of aircraft; and
    a direction symbol displaying a direction of the aircraft on the current path of the aircraft, the modified but not executed route of the aircraft, or the inactive route of the aircraft.

9. The flight information system of claim 8 wherein the lateral display further displays:
    a distance symbol displaying a distance away, relative to the position symbol, of the aircraft, the destination position, or the waypoint position.

10. A computer-implemented method of displaying flight information regarding an aircraft comprising:
    selecting a position symbol comprising a reference position, that a plan vertical situation display will display and be positioned around, based on a position of an aircraft, a destination position, a waypoint position, a selected coordinate position, or a cursor selected position, by using one of a plurality of separate controllers comprising an airplane position controller, a destination position controller, a waypoint position controller, a selected coordinate position controller, and a cursor selected position controller;

displaying in the plan vertical situation display a vertical view of a flight path of the aircraft referenced around the selected position symbol, a path symbol representing a current path of the aircraft, a modified but not executed route of the aircraft, or an inactive route of the aircraft, and a terrain symbol representing a vertical terrain in the flight path along the path symbol; and intermittently toggling, one at a time, the reference position in the plan vertical situation display between each of the position of the aircraft, the destination position, the waypoint position, the selected coordinate position, and the cursor selected position, by using the plurality of separate controllers; and displaying and positioning the plan vertical situation display around the reference position.

11. The computer-implemented method of claim 10 wherein the displaying further comprises centering the vertical view of the flight path displayed in the plan vertical situation display around the selected position symbol.

12. The computer-implemented method of claim 10 further comprising intermittently toggling between and displaying, each of one at a time, the path symbol between the current path of the aircraft, the modified but not executed route of the aircraft, or the inactive route of the aircraft.

13. The computer-implemented method of claim 10 further comprising displaying in a lateral display a corresponding horizontal view of the flight path shown by the plan vertical situation display.

14. The computer-implemented method of claim 13 further comprising intermittently toggling, one at a time, in the lateral display between each of the position of the aircraft, the destination position, the waypoint position, the selected coordinate position, and the cursor selected position; and displaying and positioning the lateral display around the reference position.

* * * * *